United States Patent [19]

Guthrie

[11] Patent Number: 4,810,571
[45] Date of Patent: Mar. 7, 1989

[54] SYNTHETIC SHEET COMPOSITE

[75] Inventor: David W. Guthrie, Roswell, Ga.

[73] Assignee: Kimberly-Clark Corporation, Neenah, Wis.

[21] Appl. No.: 87,476

[22] Filed: Aug. 20, 1987

[51] Int. Cl.[4] .............................................. B32B 27/00
[52] U.S. Cl. ................... 428/286; 156/62.8; 156/285; 156/313; 156/324; 428/287; 428/288; 428/290
[58] Field of Search .............. 428/286, 287, 288, 290; 156/62.8, 285, 313, 324

[56] References Cited

U.S. PATENT DOCUMENTS

| | | | |
|---|---|---|---|
| 3,546,062 | 12/1970 | Herrman | 161/169 |
| 3,622,434 | 11/1971 | Newman | 161/128 |
| 4,340,563 | 7/1982 | Appel et al. | 264/518 |
| 4,508,113 | 4/1985 | Malaney | 128/132 D |
| 4,529,625 | 7/1985 | Reidenbach | 428/286 |
| 4,668,566 | 5/1987 | Braum | 428/286 |

Primary Examiner—Marion C. McCamish
Attorney, Agent, or Firm—Patrick C. Wilson

[57] ABSTRACT

There is disclosed a synthetic sheet composite that is tear resistant and has paper-like aesthetic qualities. The composite comprises two spun filament polymer webs of unbonded continuous filaments with a binder web sandwiched between. The binder has a melting point below that of the spun filament webs. When the composite is subjected to heat and pressure the binder melts, and fills the interstital space between the filaments, and binds the filaments together. The filaments are encapsulated within the composite but retain their discrete identity. The filaments at the surface are exposed, flattened, discrete, and adhered to the binder.

16 Claims, 2 Drawing Sheets

SYNTHETIC SHEET COMPOSITE

BACKGROUND OF THE INVENTION

This invention relates generally to synthetic sheet composites, and more particularly concerns a durable, tear resistant synthetic sheet composite having paper-like aesthetic qualities.

Envelopes used by couriers and other packages which are traditionally made of paper are often subjected to conditions in which paper packaging will likely fail. Such envelopes and packages may be subjected to moisture or to tearing and abrasion during handling and shipment. Most paper products simply cannot undergo the kinds of abuse which courier envelopes and other such packages encounter.

The only paper-like product presently available for such commercial applications is a linear polyethylene sheet material sold under the trademark TYVEK by DuPont of Wilmington, Del. TYVEK is flash-spun from a solvent at 200° C. and 1,000 pounds per square inch (psi). The flash spinning attenuates and fractures the polyethylene into continuous fibrils that are collected on a moving belt and then thermally bonded to each other by a heated supercalender. Such material, however, while having adequate tensile strength and initial tear resistance, is easily torn once material has been slit or torn.

SUMMARY OF THE INVENTION

It is, therefore, an object of the present invention to provide a synthetic sheet composite which has paper-like aesthetic qualities, is tear resistant both to initial tearing and after being torn or slit, is abrasive resistant, is printable, opaque, and has the general look and feel of paper.

The foregoing object is accomplished by a synthetic sheet composite formed from two outside webs of randomly oriented thermoplastic filaments in which the individual filaments are not bonded to each other. Sandwiched between the two nonwoven webs is an intermediate binder layer, generally film, which has a lower melting temperature than the filaments of the exterior web. The three layers are subjected to hot calendering at sufficient heat and pressure to assure that the binder melts and flows within the nonwoven webs to encapsulate the continuous fibers within the nonwoven webs. Because the nonwoven outside layers keep the binder from direct contact with the calender rolls, the binder will not stick to and build up on the calender rolls, and therefore, aggressive adhesive binders can be used to encapsulate the filaments of the nonwoven webs. The heat and pressure are not, however, sufficient to melt the continuous nonwoven filaments or to disturb the molecular orientation of the filaments. Consequently, the filaments encapsulated within the binder remain discrete, and the filaments at the surface remain exposed, discrete, flattened, and bonded to the underlying binder layer.

Other objects and advantages of the invention will become apparent upon reading the following detailed description and upon reference to the drawings.

DETAILED DESCRIPTION OF THE INVENTION

While the invention will be described in connection with a preferred embodiment and method, it will be understood that I do not intend to limit the invention to that embodiment or method. On the contrary, I intend to cover all alternatives, modifications, and equivalents as may be included within the spirit and scope of the invention as defined by the appended claims.

Figure 1:
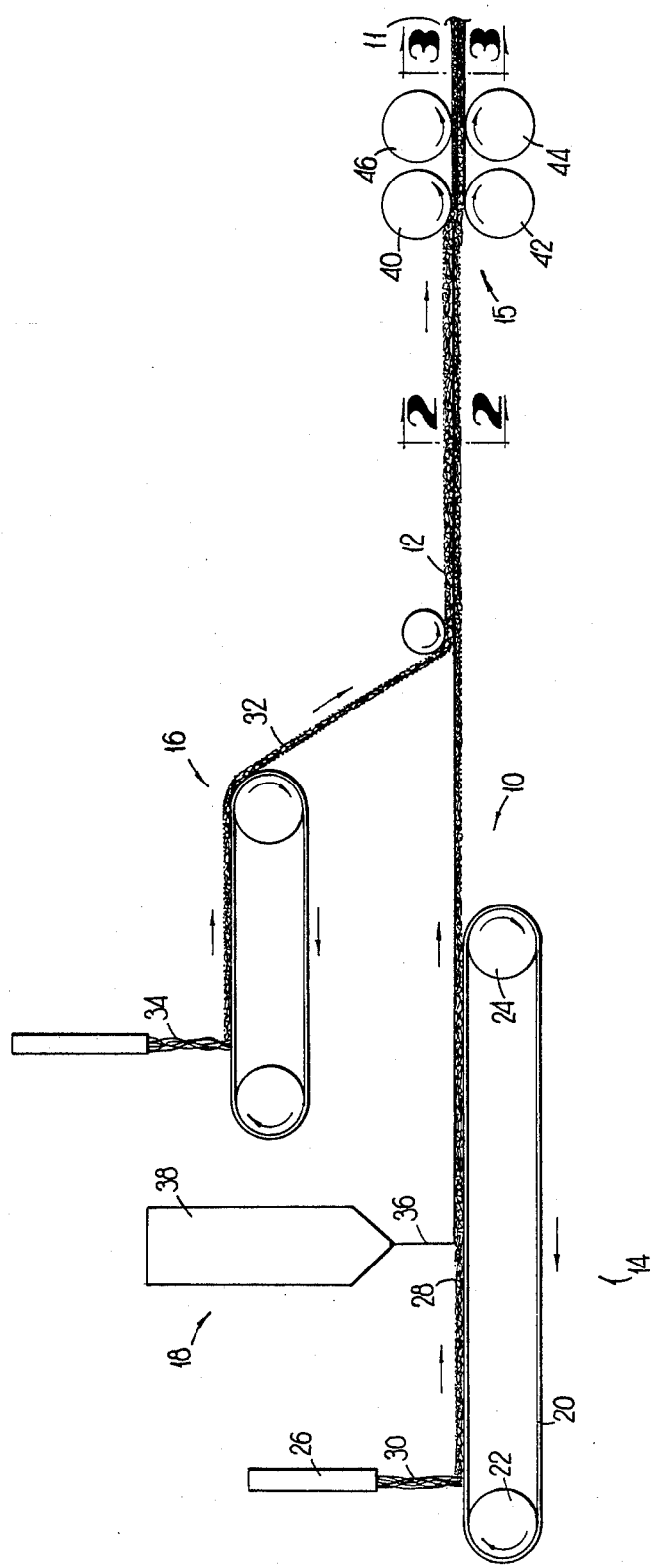
FIG. 1 is a schematic representation of the process for making the sheet composite of the present invention.

Turning to FIG. 1, there is shown schematically a forming apparatus 10 for making a sheet composite 11 in accordance with the present invention. The apparatus 10 includes a first spun filament station 14, a second spun filament station 16, a film extrusion station 18, and a calendering station 15. The spun filament stations 14 and 16 are in all important regards the same. The spun filament station 14 includes a continuous foraminous belt 20 mounted upon rollers 22 and 24 for movement as indicated by the arrows. Spun filament head 26 is mounted above the foraminous belt 20 and produces nonwoven spun filament web 28 of substantially continuous and randomly deposited, molecular oriented filaments 30 of thermoplastic polymer.

The nonwoven spun filament web 28 is prepared in conventional fashion such as illustrated by the following patents: Kinney U.S. Pat. Nos. 3,338,992 and 3,341,394; Levy U.S. Pat. No. 3,276,944; Peterson U.S. Pat. No. 3,502,538; Hartmann U.S. Pat. Nos. 3,502,763 and 3,909,009; Dobo, et al. U.S. Pat. No. 3,542,615; Appel et al U.S. Pat. No. 4,340,563; and Harmon Canadian Patent No. 803,714. Spun filament materials prepared with continuous filaments 30 generally have at least three common features. First, the polymer is continuously extruded through a spinneret to form discrete filaments. Thereafter, the filaments are drawn either mechanically or pneumatically without breaking in order to orient the molecules of the polymer filaments and achieve tenacity. Lastly, the continuous filaments are deposited in a substantially random manner onto the carrier belt 20 to form the web 28. In conventional practice, the web is usually calendered so that the filaments are bonded at their crossing points. Particularly the molecular orientation of the filaments is disturbed by the bonding thereby producing weak spots at the point of bonding. In accordance with the present invention, the nonwoven web 28 is not calendered after formation, and the filaments are not bonded at their crossing points. While the filaments 30 may have some residual tackiness when they hit the belt and therefore may stick together, the molecular orientation of the filaments is not disturbed, and they are not in that sense bonded one to the other at their crossing points. The spun filament station 16 in the same fashion produces nonwoven spun filament web 32 of randomly oriented continuous thermoplastic filaments 34 which are not self-bonded.

The nonwoven spun filament webs 28 and 32 may be formed of any thermoplastic material that can be spun into continuous filaments. Appropriate polymers include polyolefins, polyesters, and polyamides. The preferred polymer is polypropylene.

Once the nonwoven web 28 has been formed, a film layer 36 of thermoplastic binder is extruded from an extrusion head 38 onto the nonwoven spun filament web 28. The binder layer 36 may also be supplied to the sheet composite as a preformed web of material. The binder material may include ethylene vinyl acetate, polyethylene acrylic acid, copolyester, and polyamide. The preferred binder is an adhesive modified polyethylene vinyl acetate.

Figure 2:
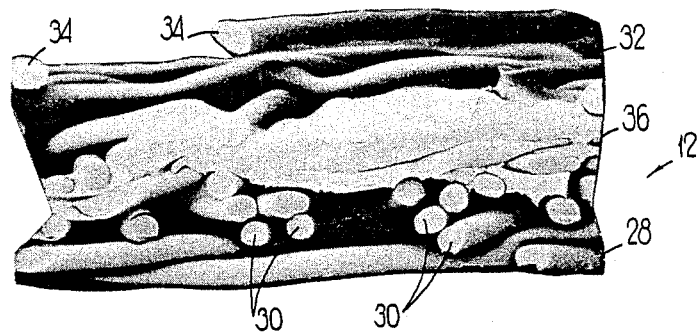
FIG. 2 is a microphotograph (200×) showing the cross-section of the sheet composite along line 2—2 of FIG. 1 before calendering.

The combination of the spun filament web 28 and the extrusion film layer 36 is then overlaid with the spun filament web 32 to form a three-layer composite 12. The three-layer composite 12 is shown in cross-section in FIG. 2. Particularly, the three-layer composite 12 includes the nonwoven web 32, the binder film layer 36, and the other nonwoven web 28. As can be clearly seen in FIG. 2, each of the nonwoven layers 28 and 32 are composed of discrete individual filaments 30 and 34 which are not bonded to each other. The film layer 36, on the other hand, is a continuous homogeneous phase.

After the composite 12 has been formed, it is subjected to heat and pressure by means of two sets of calender rolls including a first set having a high temperature roll 40 and a lower temperature roll 42 and a second set of rolls having a high temperature roll 44 and a lower temperature roll 46. The calendering process produces the sheet composite 11 of the present invention which is shown in cross-section in FIG. 3.

Figure 3:
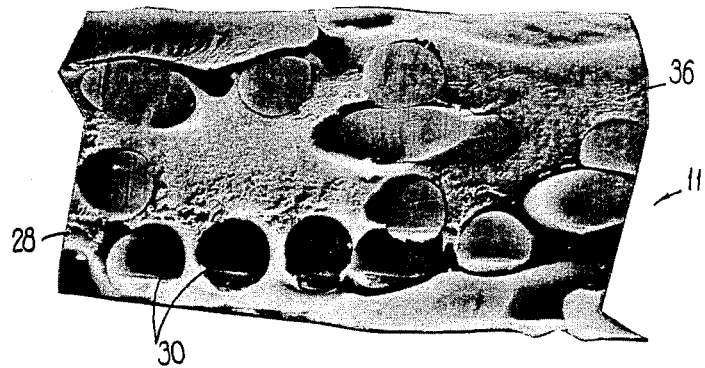
FIG. 3 is a microphotograph (500×) showing the cross-section of the sheet composite along line 3—3 of FIG. 1 after calendering.

As can be seen from FIG. 3, within the boundaries of the composite, the binder material 36 has completely melted and occupies the interstitial space between the filaments 30 to form a continuous matrix. In that regard, the viscosity of the binder when heated must have a melt index greater than 3 as determined by ASTM D123-65T to assure proper flow of the binder into the interstitial spaces. The filaments 30 of nonwoven web 28 are still discrete and are completely encapsulated by the binder material 36. The term "discrete" means that the filaments 30 are individually identifiable within the composite. In that regard, as can be seen from the microphotograph of FIG. 3, the filaments 30 are easily identified because they maintain their basic cylindrical shape within the continuous matrix of the binder material 36 within the composite 11.

Because the molecular orientation of the filaments is not disturbed by the encapsulation, the filaments do not have weak spots that are found in conventional spun filament webs which have been subjected to bonding (and resulting molecular orientation disturbances) where the filaments cross each other. The discrete and unbonded nature of the filaments within the matrix of the binder assures that the resulting composite is strong and has both initial and slit tear resistance. The encapsulation of the filaments by the binder provides stabilization between the filaments to increase durability, establish internal delamination resistance, and to provide paper-like aesthetics for the resulting composite.

Figure 4:
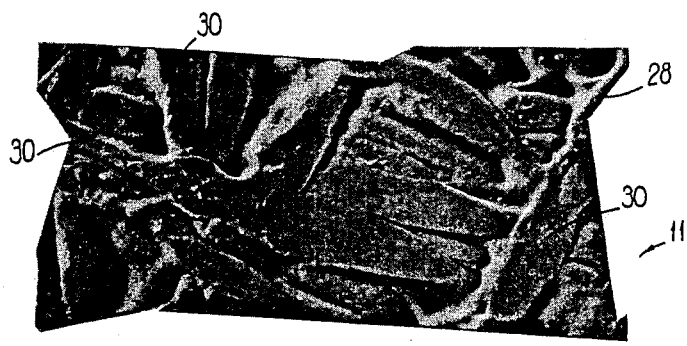
FIG. 4 is a microphotograph (200×) showing the outside surface of the sheet composite of the present invention.

The calendering is carried out at pressures and temperatures that are selected to assure that the binder 36 melts and encapsulates the filaments 30 within the composite 11, but that the filaments are not destroyed or degraded within the composite nor is the molecular orientation of the filaments disturbed within the nonwoven web. The calendering conditions are also selected so that the surface filaments are flattened and adhered to the binder matrix to form a smooth surface without destroying their discrete appearance at the surface. The term "discrete" means that the surface filaments, while flattened as a result of the calendering, are still recognizable as being individual filaments and not simply a homogeneous surface mass (FIG. 4). While it is important that the filaments remain discrete and with their molecular orientation undisturbed, the present invention contemplates that the filaments at the surface may still melt sufficiently to stick to each other without bonding and without disturbing their molecular orientation.

In order to form the composite with the discrete filaments intact both inside and on the surface, it is necessary that the melting point of the binder be at least 10° C. below that of the melting point of the filaments. It is also necessary for the viscosity of the binder to be greater than 3 melt index during calendering. Melting points for the filaments were determined usng ASTM Standard D795 with a Fisher-Johns melting point apparatus. All melting points were determined at normal atmospheric pressure.

The three-layer structure allows the use of an aggressive binder because the outside layers isolate the binder material from the calender rolls thereby preventing stick and buildup of binder on the rolls.

The following examples are illustrative of sheet composites and methods according to the present invention.

EXAMPLE 1

A 14-inch wide sheet composite was prepared by forming a nonwoven web comprising a number of randomly oriented continuous polypropylene filaments using conventional melt-spinning techniques. The polypropylene used in preparing the web was Himont, PC 973, manufactured by Himont U.S.A., Inc., Wilmington, Del., and had a melting point of 165° C. The resulting filaments in the nonwoven web had an average diameter of about 18 to 25 microns and the filaments were not self-bonded one to another. The web was spun to a basis weight of 0.87 ounces per yard square (oz-/yd$^2$).

A binder web of extruded polyethylene vinyl acetate film was sandwiched between two layers of the nonwoven web. The ethylene vinyl acetate film was Melthene ® 5030, manufactured by U.S.I. Chemical Company, Cincinnati, Ohio, which comprised a modified adhesive additive and had a melting point of 100° C. and a flow viscosity of 86 melt index. The extruded binder film contained 20% by weight of titanium dioxide as a pigment. The extruded web had a basis weight of 0.87 oz/yd$^2$ resulting in a total sheet composite of 2.6 oz-/yd$^2$.

The sheet composite was then passed through a supercalender at a pressure of 500 psi and a speed of 20 feet per minute (ft/min). The high temperature roll was maintained at 142° C. and the lower temperature roll at 104° C. In carrying out the calendering process, the composite was calendered in one pass and then turned over and calendered again to simulate two sets of rolls as shown in FIG. 1.

The resulting sheet composite had paper-like aesthetic characteristics with exceptional tear resistance. Particularly, the sheet composite xhibited the following physical characteristics:

Machine direction strip tensile—32 lb/in.
Cross direction strip tensile—15 lb/in.

Machine direction slit trapezoidal tear resistance—27 lb.
Cross direction slit trapezoidal tear resistance—20 lb.
Machine direction unslit trapezoidal tear resistance—57 lb.
Cross direction unslit trapezoidal tear resistance—39 lb.
Gurley porosity—198 sec.
Sheffield smoothness—350
Opacity—78

The physical characteristics were determined in accordance with the following test procedures. Strip tensile strength was measured in accordance with TAPPI 494-om-81. Slit trapezoidal tear resistance was determined in accordance with ASTM D1117-80. Unslit trapezoidal tear resistance was determined in accordance with ASTM D1117-80. Gurley porosity was determined in accordance with TAPPI 460-os-83. Sheffield smoothness was determined in accordance with TAPPI um-518. Opacity was determined in accordance with TAPPI T425-om-81 and melt index was determined in accordance with ASTM D123-65T.

EXAMPLE 2

A sheet composite was prepared in accordance with Example 1 except that the binder web was a polyethylene vinyl acetate film having a melting point of 105° C., a flow viscosity of 30 melt index, 18% vinyl acetate comonomer, and was Norchem 3050A, manufactured by U.S.I. Chemical Company, Cincinnati, Ohio. The resulting sheet composite had the following physical properties.
Machine direction strip tensile—15 lb/in.
Cross direction strip tensile—7 lb/in.
Machine direction slit trapezoidal tear resistance—12 lb.
Cross direction slit trapezoidal tear resistance—9 lb.
Machine direction unslit trapezoidal tear resistance—17 lb.
Cross direction unslit trapezoidal tear resistance—12 lb.
Gurley porosity—195 sec.
Sheffield smoothness—360
Opacity—78

EXAMPLE 3

The sheet composite was prepared in accordance with Example 1 except that the binder web was polyethylene acrylic acid film having a melting point of 115° C., a flow viscosity of 500 melt index, and comprising 20% acrylic acid comonomer. The polyethylene acrylic acid was Primacor 5983, manufactured by Dow Chemical, Midland, Mich. The resulting sheet composite had the following physical characteristics:
Machine direction strip tensile—17 lb/in.
Cross direction strip tensile—8 lb/in.
Machine direction slit trapezoidal tear resistance—12 lb.
Cross direction slit trapezoidal tear resistance—9 lb.
Machine direction unslit trapezoidal tear resistance—16 lb.
Cross direction unslit trapezoidal tear resistance—12 lb.
Gurley porosity—240 sec.
Sheffield smoothness—355
Opacity—76

EXAMPLE 4

A 55-inch wide sheet composite was prepared by forming a nonwoven web comprising a number of randomly oriented continuous polypropylene filaments using Lurgi melt spinning equipment. The polypropylene was Himont, P.C. 973, manufactured by Himont U.S.A., Inc., Wilmington, Del., and had a melting point of 165° C. The resulting filaments in the nonwoven web had an average diameter of about 18 to 27 microns, and the filaments were not self-bonded one to another. The web was spun to a basis weight of 0.8 oz/yd$^2$. A binder web of extruded polyethylene vinyl acetate film was sandwiched between two layers of the nonwoven web. The ethylene vinyl acetate film was Melthene 5030, manufactured by U.S.I. Chemical Company, Cincinnati, Ohio, and comprised a modified adhesive additive. The extruded binder film contained 30% by weight of titanium dioxide as a pigment. The extruded web had a basis weight of 0.87 oz/yd$^2$ resulting in a total sheet composite weight of 2.5 oz/yd$^2$.

The sheet composite was then passed through a thermobonding calender at 2000 psi, and at a speed of 65 ft/min. The higher temperature roll was maintained at 160° C., and the lower temperature roll was maintained at 149° C. The resulting sheet composite had the following physical characteristics:
Machine direction strip tensile—23 lb/in.
Cross direction strip tensile—22 lb/in.
Machine direction slit trapezoidal tear resistance—9 lb.
Cross direction slit trapezoidal tear resistance—12 lb.
Machine direction unslit trapezoidal tear resistance—11 lb.
Cross direction unslit trapezoidal tear resistance—16 lb.
Gurley porosity—36 sec.
Sheffield smoothness—310
Opacity—90

I claim:
1. A synthetic sheet composite comprising:
   a first and second web each having a plurality of randomly oriented filaments which are not self-bonded to each other, said filaments having a filament melting point,
   a thermoplastic binder sandwiched between and bonded to said filaments of said first and second webs, said binder having a binder melting point at least 10° C. below said filament melting point, said binder further having a flow vicosity greater than 3 melt index,
   said composite being calendered using heat and pressure to cause said binder to encapsulate said filaments of said composite and form a surface with discrete, flattened filaments.
2. The sheet composite of claim 1, wherein the filaments are formed froma thermoplastic material selected from the group consisting of polypropylene, polyethylene, polyester, and polyamide, and the binder is selected from the group consisting of ethylene vinyl acetate, polyethylene acrylic acid, copolyester, and polyamide.
3. A synthetic sheet composite comprising:
   (a) a first web and a second web each comprising a number of randomly oriented continuous thermoplastic filaments which filaments have a melting point and are not self-bonded to each other; and
   (b) a thermoplastic homogeneous binder having a bindet melting point sandwiched between the two webs and encapsulating the filaments of each web within each web.

4. The sheet composite of claim 3, wherein the binder melting point is at least 10° C. below the filament melting point.

5. The sheet composite of claim 3, wherein the binder has a flow vicosity greater than 3 melt index.

6. The sheet composite of claim 3, wherein the composite has two outside surfaces and the filaments at the surfaces are exposed, discrete, flattened, and adhered to the binder.

7. The sheet composite of claim 3, wherein the filaments are formed from a thermoplastic material selected from the group consisting of polypropylene, polyethylene, polyester, and polyamide, and the binder is selected from the group consisting of ethylene vinyl acetate, polyethylene acrylic acid, copolyester, and polyamide.

8. A method of making a synthetic sheet composite having outside surfaces comprising the steps of:
  (a) laying a first nonwoven web of randomly oriented filaments, which filaments have a first filament melting point and are not bonded to each other;
  (b) overlaying on said nonwoven web a binder having a binder melting point and a flow vicosity greater than 3 melt index, said binder melting point being at least 10° C. below said first filament melting point;
  (c) overlaying on said binder a second nonwoven web of randomly oriented filaments, which filaments have a second filament melting point at least 10° C. above said binder melting point; and
  (d) calendering said binder and first and second webs with sufficient heat and pressure to cause said binder to encapsulate said filaments and leave said filaments at the outside surfaces exposed, discrete, flattened and adhered to said binder.

9. The method of claim 8, wherein the filaments are formed from a thermoplastic material selected from the group consisting of polypropylene, polyethylene, polyester, and polyamide and the binder is selected from the group consisting of ethylene vinyl acetate, polyethylene acrylic acid, copolyester, and polyamide.

10. The method of claim 9, wherein the calendering step is carried out at a speed between 20 ft/min and 65 ft/min, at a pressure between 500 psi and 2000 psi and at a temperature at the outside surface of the nonwoven web between 104° C. and 160° C.

11. A method for making a synthetic sheet composite having outside surfaces comprising the steps of:
  (a) laying a first nonwoven web of randomly oriented continuous thermoplastic filaments, which filaments have a first filament melting point, are discrete, and are not bonded to each other;
  (b) overlaying on the first nonwoven web a thermoplastic binder having a binder melting point;
  (c) overlaying on the binder a second nonwoven web of randomly oriented continuous thermoplastic filaments, which filaments have a second filament melting point, are discrete, and are not self-bonded to each other; and
  (d) calendering the webs with sufficient heat and pressure to cause the binder to encapsulate the filaments within the nonwoven webs.

12. The method of claim 11, wherein the binder melting point is at least 10° C. below the first and second filament melting points.

13. The method of claim 11, wherein the binder has a flow vicosity greater than 3 melt index.

14. The method of claim 11, wherein the heat and pressure are selected so that the filaments at the outside surfaces are exposed, discrete, flattened, and adhered to the binder.

15. The method of claim 11, wherein the filaments are formed from a thermoplastic material selected from the group consisting of polypropylene, polyethylene, polyester, and polyamide and the binder is selected from the group consisting of ethylene vinyl acetate, polyethylene acrylic acid, copolyester, and polyamide.

16. The method of claim 15, wherein the calendering step is carried out at a speed between 20 ft/min and 65 ft/min, at a pressure between 500 psi and 2000 psi, and at a temperature at the outside surfaces of the composite between 104° C. and 160° C.

* * * * *

UNITED STATES PATENT AND TRADEMARK OFFICE
CERTIFICATE OF CORRECTION

PATENT NO. : 4,810,571
DATED : March 7, 1989
INVENTOR(S) : David W. Guthrie

It is certified that error appears in the above—identified patent and that said Letters Patent is hereby corrected as shown below:

Column 4, line 65, "xhibited" should read --exhibited--;

Column 6, line 57, "froma" should read --from a--

Signed and Sealed this

Ninth Day of February, 1993

Attest:

STEPHEN G. KUNIN

Attesting Officer     Acting Commissioner of Patents and Trademarks